United States Patent
Simitsis et al.

(10) Patent No.: US 10,489,416 B2
(45) Date of Patent: Nov. 26, 2019

(54) OPTIMIZING AND MANAGING EXECUTION OF HYBRID FLOWS

(71) Applicant: ENTIT Software LLC, Sunnyvale, CA (US)

(72) Inventors: Alkiviadis Simitsis, Santa Clara, CA (US); William K. Wilkinson, San Mateo, CA (US); Umeshwar Dayal, Saratoga, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 689 days.

(21) Appl. No.: 13/779,826

(22) Filed: Feb. 28, 2013

(65) Prior Publication Data

US 2014/0244570 A1 Aug. 28, 2014

(51) Int. Cl.
*G06F 16/25* (2019.01)
*G06F 16/2453* (2019.01)

(52) U.S. Cl.
CPC ...... *G06F 16/254* (2019.01); *G06F 16/24542* (2019.01)

(58) Field of Classification Search
CPC ......... G06F 17/30563; G06F 16/24542; G06F 16/254
USPC ................................ 707/797, 800, 809, 822
See application file for complete search history.

(56) References Cited

U.S. PATENT DOCUMENTS

| 5,946,487 | A | 8/1999 | Dangelo |
| 7,689,582 | B2 | 3/2010 | Behnen et al. |
| 9,886,524 | B1 * | 2/2018 | Richardson ........... G06F 16/951 |
| 2007/0198439 | A1 * | 8/2007 | Shriraghav et al. .......... 705/400 |
| 2007/0276851 | A1 * | 11/2007 | Friedlander ........... G06F 16/283 |
| 2009/0327242 | A1 * | 12/2009 | Brown et al. ..................... 707/3 |
| 2013/0104140 | A1 * | 4/2013 | Meng .................... G06F 9/5066 718/104 |
| 2013/0346988 | A1 * | 12/2013 | Bruno ................... G06F 9/5066 718/102 |
| 2014/0207755 | A1 * | 7/2014 | Hacigumus ....... G06F 16/24542 707/718 |
| 2015/0269235 | A1 * | 9/2015 | Bonagiri ............... G06F 16/254 707/602 |

OTHER PUBLICATIONS

Greg Barish et al., "Dataflow Plan Execution for Software Agents," Feb. 28, 2000, pp. 1-3, Available at: <citeseerx.ist.psu.edu/viewdoc/summary?doi=10.1.1.41.6000>.

Johann Eder and Michael Saringer, "Workflow Evolution: Generation of Hybrid Rows," Proceedings of the 9th International Conference on Object-Oriented Information Systems (OOIS 2003), Sep. 2-5, 2003, Geneva, Switzerland, LNCS 2817, pp. 279-283, Available at: <eprints.cs.univie.ac.at/1000>.

Krishna M. Kavi et al., "Comparing Execution Performance of Scheduled Dataflow With RISC Processors," Jul. 24, 2000, pp. 1-7, Available at: <csrl.unt.edu/~kavi/Research/pdcs-sdf-00.pdf>.

(Continued)

*Primary Examiner* — Marcin R Filipczyk

(57) ABSTRACT

Disclosed herein are techniques for optimizing and managing the execution of hybrid flows. An execution plan is generated for each hybrid flow based at least partially on attributes associated therewith. The execution of each hybrid flow is managed in accordance with the execution plan.

16 Claims, 6 Drawing Sheets

(56) References Cited

OTHER PUBLICATIONS

A. Simitsis, et al., "Optimizing etl workflows for fault-tolerance", 2010 IEEE, ICDE Conference 2010, pp. 385-396.
A. Simitsis, et al., "Optimizing analytic data flows for multiple execution engines", SIGMOD '12, May 20-24, 2012, pp. 829-840.
E. Iori, et al. "Cloudalloc: a monitoring and reservation system for compute clusters", May 2012, 5 pages.
G. Graefe and W. J. McKenna, "The volcano optimizer generator: Extensibility and efficient search", 1993, 10 pages.
H.T. Kung, et al., "On finding the maxima of a set of vectors", ACM, vol. 22, No. 4, Oct. 1975, pp. 469-476.
P.G. Selinger et al., "Access path selection in a relational database management system", ACM, 1979, 12 pages.
S. Chaudhuri, "An Overview of Query Optimization in Relational Systems", 1998, Seattle, WA, pp. 34-43.
T. K. Sellis, "Multiple-query optimization", ACM Transactions on Database Systems, vol. 13, No. 1, Mar. 1988, pp. 23-52.
Y. E. Ioannidis, "Query optimization", Computer Sciences Department, University of Wisconsin, 1996, 38 pages.

* cited by examiner

| ID 502 | COST 504 | SIZE 506 | RPs 508 | PAR 510 | SCORE 512 | BEST-FOR 516 |
|---|---|---|---|---|---|---|
| 441 | 2295660 | 29 | 0 | 4 | 577 | performance (pdb-n) |
| 512 | 2295935 | 32 | 2 | 2 | 592 | performance (pdb-d) |
| 624 | 2303204 | 38 | 0 | 4 | 603 | performance (mr) |
| 13 | 2350115 | 21 | 0 | 0 | 661 | maintainability |
| 1779 | 3743899 | 52 | 15 | 2 | 1332 | recoverability (hard) |
| 951 | 2295890 | 32 | 3 | 1 | 484 | recoverability (soft) |
| 348 | 2350669 | 27 | 6 | 0 | 433 | globally optimal |
| 233 | 2296219 | 35 | 6 | 1 | 439 | optimal in all but maintainability |

OPTIMIZING AND MANAGING EXECUTION OF HYBRID FLOWS

Many enterprises maintain and process large amounts of data from a variety of storage repositories. For example, an organization may use structured query language ("SQL") to execute a query operation and a map-reduce environment to process the results of the query. Data warehouses may provide tools to extract, transform, and load data ("ETL tools"). Some ETL tools permit a user to specify a series of operations that are executable across a plurality of execution environments.

BRIEF DESCRIPTION OF THE DRAWINGS

FIG. 5 is an example table summarizing different distributions of operations across execution environments.

DETAILED DESCRIPTION

In one example, a hybrid flow may be defined as a sequence of operations that are executable across a plurality of execution environments. As noted above, ETL tools allow users to specify the sequence of operations included in a hybrid flow. As infrastructure and data become larger and more diverse, managing these hybrid flows become more difficult and tedious to manage. Each hybrid flow may have a different performance objective; an execution environment assigned to an operation may not have the current bandwidth to carry out the operation; moreover, an execution environment that was thought to be online may no longer be active.

In view of the foregoing, disclosed herein are a system, non-transitory computer readable medium, and method to optimize and manage execution of hybrid flows. In one example, an execution plan may be generated for each hybrid flow based at least partially on attributes associated therewith. In a further example, the execution of each hybrid flow may be managed in accordance with the execution plan thereof. In yet a further example, the execution plan of each hybrid flow may be optimized in accordance with a performance objective. The techniques disclosed herein allow the operations in a hybrid flow to be managed as a collective instead of individual operations. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
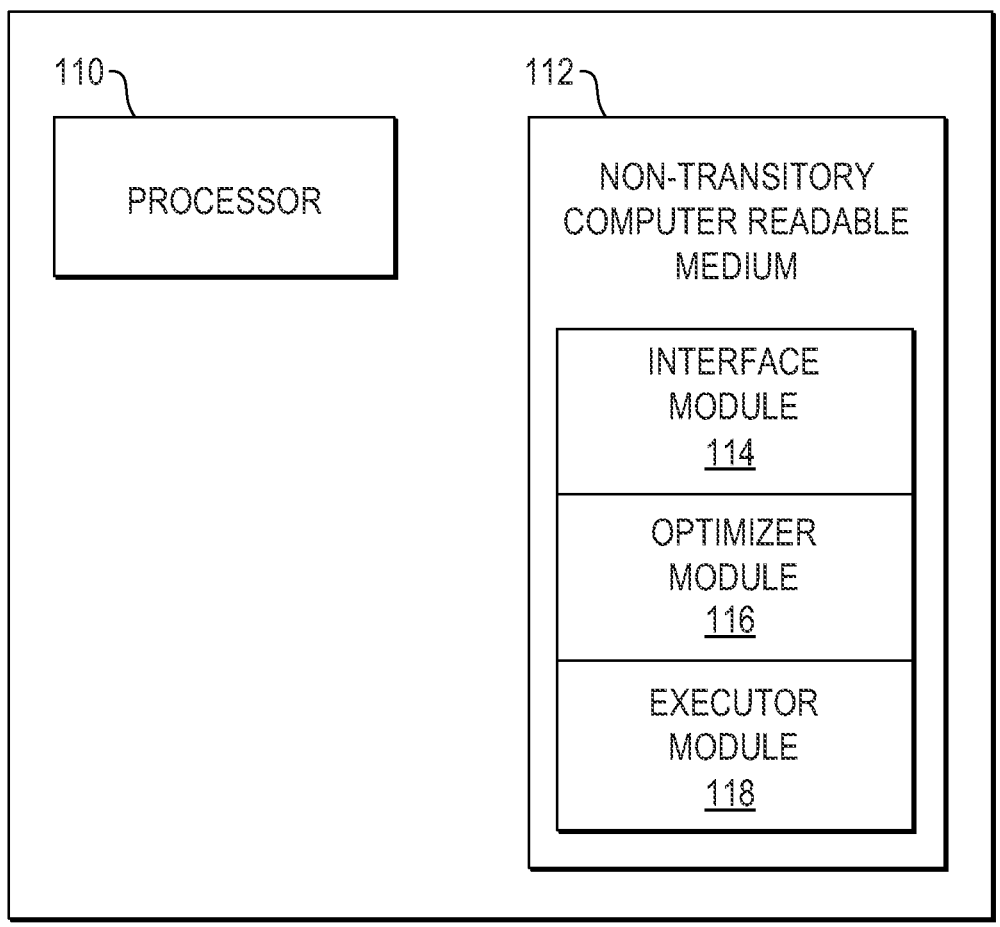
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be described in more detail below, the instructions may include an interface module 114, an optimizer module 116, and an executor module 118. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

The instructions in interface module 114 may instruct processor 110 to specify a plurality of hybrid flows. The specification of these hybrid flows may be initiated by a user or another process. Interface module 114 may further instruct a processor to specify at least one performance objective for each hybrid flow.

Optimizer module 116 may instruct processor 110 to generate an execution plan for each hybrid flow based at least partially on attributes associated therewith. The attributes associated with each hybrid flow may comprise a cost of executing each operation in a given execution environment or a cost of transferring data between execution environments. Each execution plan may contain a distribution of the operations among a plurality of execution environments. Optimizer module 116 may further optimize the execution plan of each hybrid flow in accordance with the performance objective specified by interface module 114.

Executor module 118 may instruct processor 110 to manage execution of the plurality of hybrid flows in accordance with the execution plan of each hybrid flow. Executor module 118 may request optimizer module 116 to adjust a given execution plan of a given hybrid flow based at least partially on a real time status of an execution environment specified in the given execution plan. In one example, the adjustment may include rearranging the series of operations in the hybrid flow.

Figure 2:
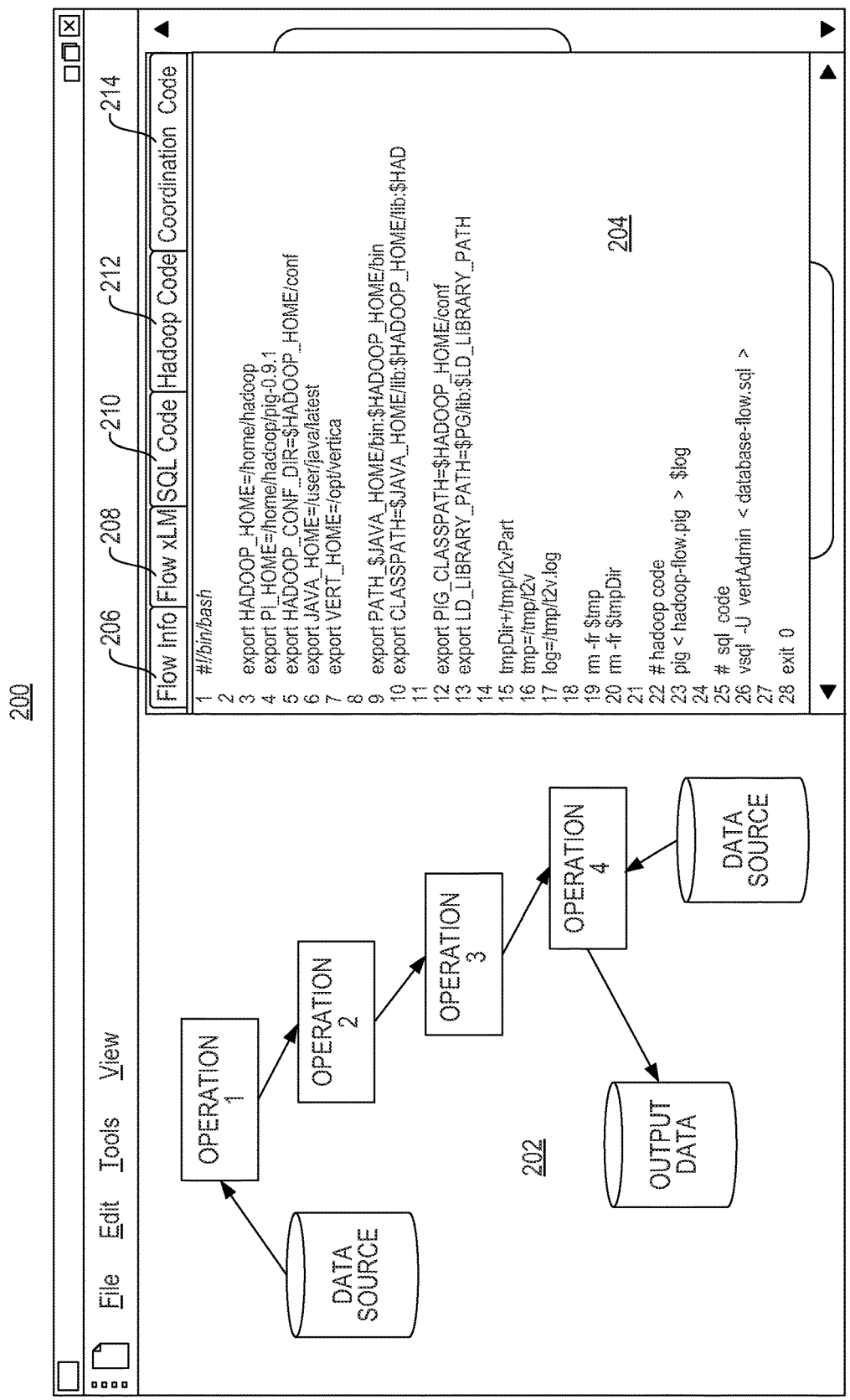
FIG. 2 is a working example of a graphical user interface in accordance with aspects of the present disclosure.

FIG. 2 illustrates an example GUI 200 that may be displayed in accordance with the instructions of interface module 114. The illustrative GUI 200 may have a left panel 202 in which a user may specify a hybrid flow by clicking and dragging icons representative of operations or data sources. In one implementation, the available environments and data sources may be preconfigured in, for example, a configuration file input. These items may be associated with icons on GUI 200. In this example, left panel 202 displays four operations. In a further example, a user may specify each operation by clicking on an icon and entering a short description of the operation therein. Alternatively, a user may upload a script containing the operations, which may then be rendered via the icons on left panel 202. Operation one and operation four are each shown having an external data input; operations two thru four are each shown receiving input from a preceding operation; operation four is also shown producing a final output of the sequence. The right panel 204 may display information associated with a tab positioned above the panel. In this example, right panel 204 is currently displaying information associated with coordination tab 214. Upon clicking coordination tab 214, right panel 204 may display executable code that coordinates the hybrid flow displayed in left panel 202.

A user clicking on flow information tab 206 may cause meta-data associated with the specified operations to be shown in right panel 204. A click on flow information tab 206 may also cause other information to be shown, such as a graph representation of the sequence of operations. A user clicking on xLM tab 208 may cause customized extendable markup language ("XML") code to be displayed in right panel 204. Such code may represent the sequence of operations specified in left panel 202. The "xLM" code may capture information regarding data structures used to implement the hybrid flow (e.g., nodes and edges of a graph or hierarchical tree of interlinked nodes). The "xLM" code may also capture design meta-data (e.g., functional and non-functional requirements or resource allocation). In another example, the "xLM" code may capture operational properties (e.g., operation type, data schema, operation statistics, parameters or expressions for implementing an operation type, or execution environment details). A user clicking on SQL tab 210 may cause the display of SQL code in right panel 204. Such SQL code may be used to implement some operations in left panel 202 as determined by optimizer module 116. A user clicking on Hadoop tab 212 may cause Hadoop code to be displayed in right panel 204. As with the aforementioned SQL code, optimizer module 116 may determine that some operations specified in left panel 202 should be implemented in Hadoop. As such, once the execution environments are selected, GUI 200 may display tabs that permit a user to view or edit the generated code executable in the selected environments.

Figure 3:
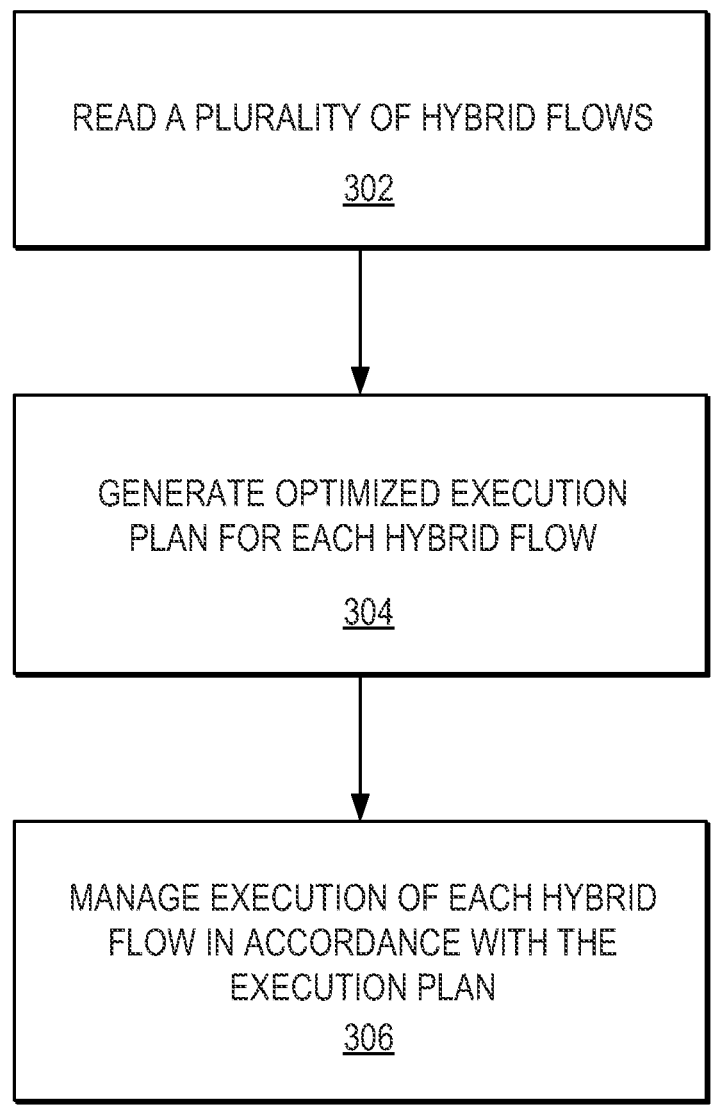
FIG. 3 is a flow diagram of an example method in accordance with aspects of the present disclosure.
Figure 4:
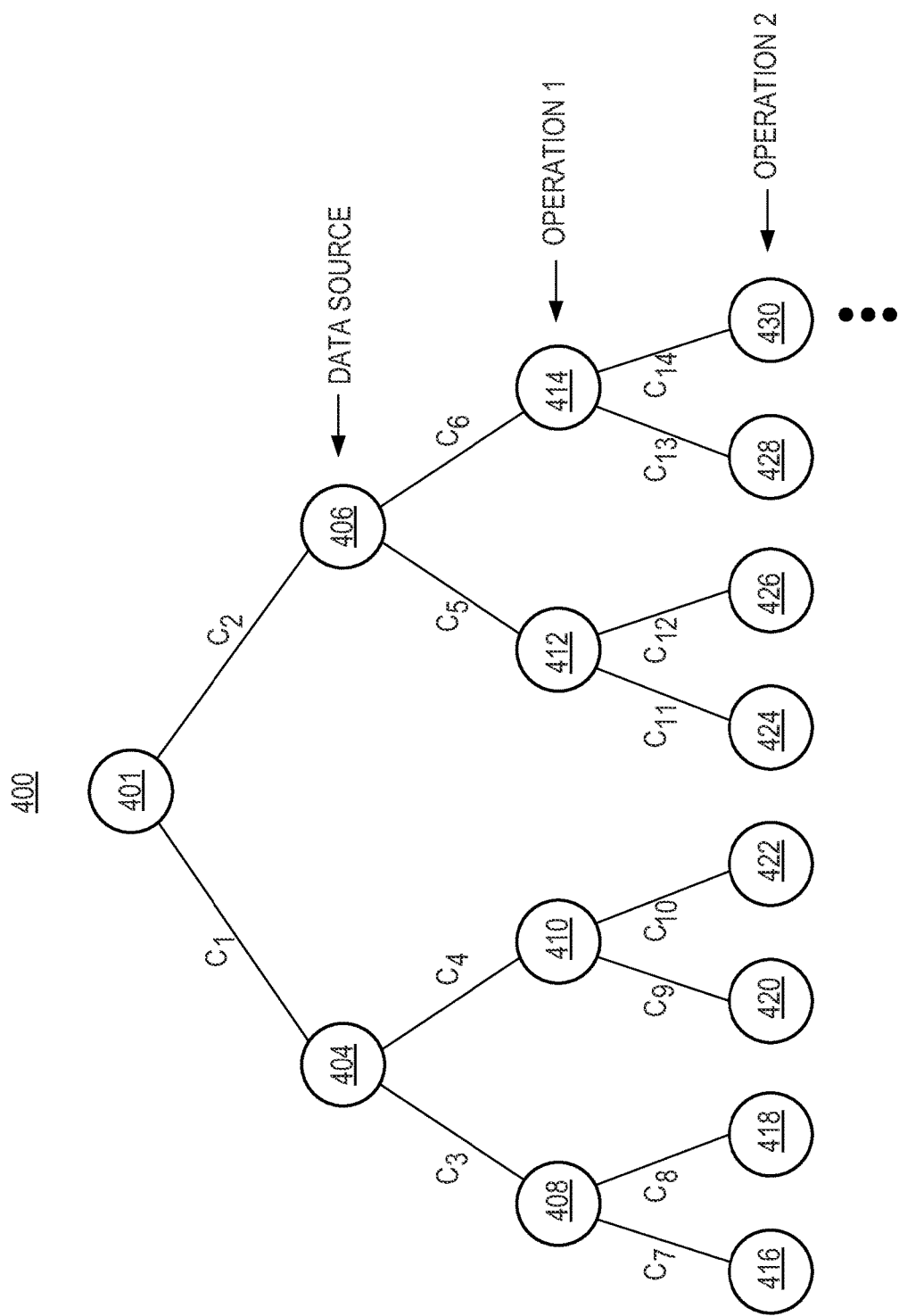
FIG. 4 is a working example of execution environment selection in accordance with aspects of the present disclosure.
Figure 6:
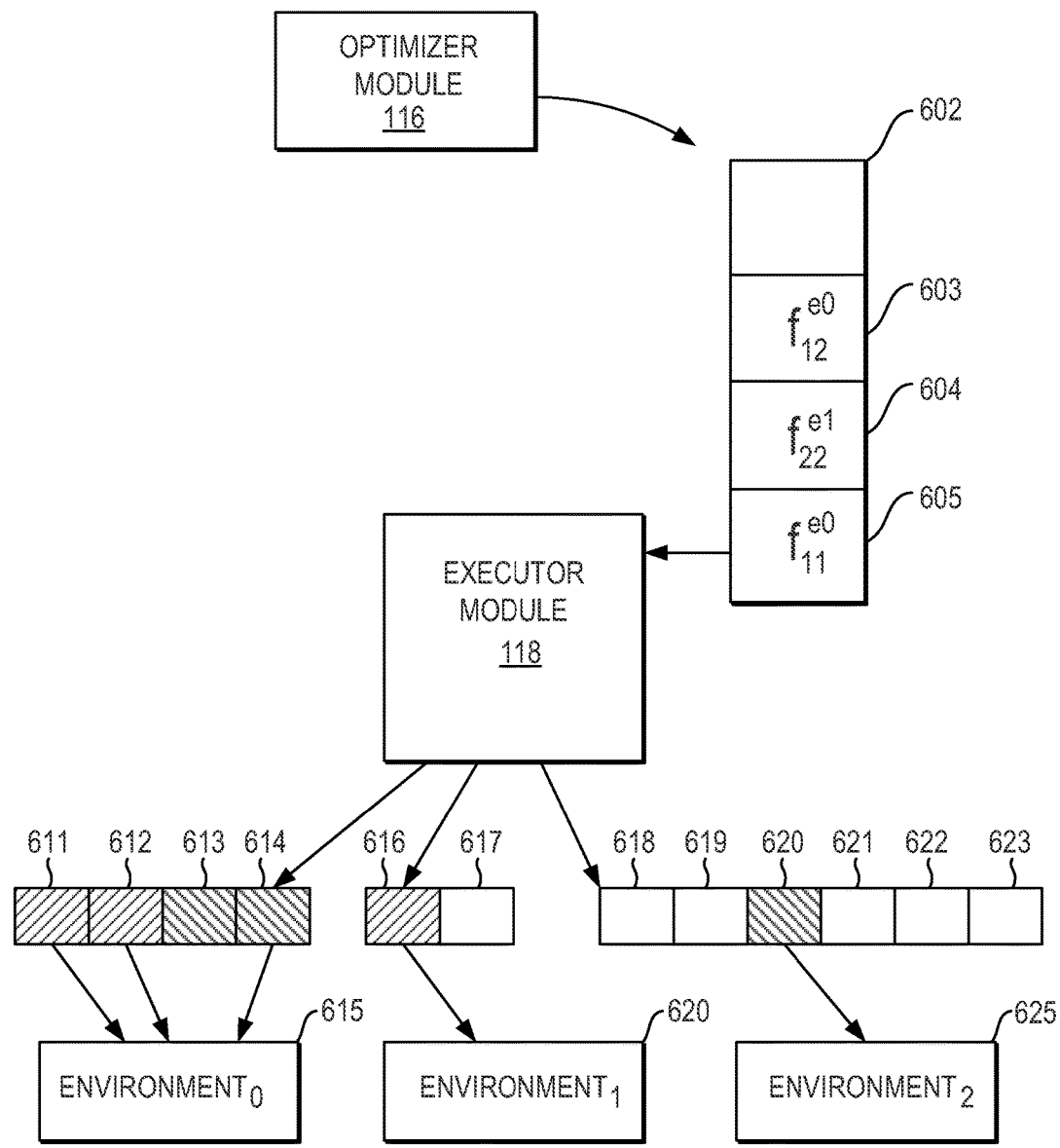
FIG. 6 is a working example of hybrid flow management in accordance with aspects of the present disclosure.

Working examples of the system, method, and non-transitory computer-readable medium are shown in FIGS. 3-6. In particular, FIG. 3 illustrates a flow diagram of an example method 300 for optimizing and managing hybrid flows. In an example, method 300 may be performed by computer apparatus 100. FIGS. 4-6 each show a working example in accordance with the techniques disclosed herein. The actions shown in FIGS. 4-6 will be discussed below with regard to the flow diagram of FIG. 3.

As shown in block 302 of FIG. 3, a plurality of hybrid flows may be read. As noted above, the hybrid flows may by specified by users via GUI 200 or may be specified by other processes. Each hybrid flow may be associated with a data object such that attributes associated with each hybrid flow may be stored in its associated data object. As noted above, the attributes associated with each hybrid flow may comprise a cost of executing each operation in a given execution environment or a cost of transferring data between execution environments. In another example, the attributes may include a desired execution start time or flow priority. As will be discussed further below, the attributes may also include at least one performance objective. As shown in block 304, an optimized execution plan may be generated for each hybrid flow. This execution plan may be based partially on an analysis of the attributes stored in the data object of each hybrid flow.

The execution plan generated by optimizer module 116 may comprise a distribution of operations in a hybrid flow among a plurality of execution environments. As noted above, the execution environments specified in the execution plan may be based at least partially on the attributes associated with a hybrid flow. The attributes associated with each hybrid flow may comprise a cost of executing each operation in a given execution environment or the cost of transferring data from one execution environment to another. In one example, the cost of executing each operation in a given execution environment may be defined as the resources consumed by each operation when implemented therein. In a further example, the resources consumed by each operation may be determined by executing benchmark programs in each candidate execution environment. As will be described in more detail below in relation to FIG. 4, the data object storing these attributes of a hybrid flow may be analyzed to determine the cost of executing the entire hybrid flow across different execution environments.

Referring now to FIG. 4, an example hierarchical data structure of interlinked nodes is shown. This example data structure may be used to analyze the attributes associated with a hybrid flow and determine an execution plan. Root node 401 may represent the start of the hybrid flow and each level of the hierarchical tree below root node 401 may be associated with an operation in the hybrid flow or with a data source. A node below root node 401 may represent a candidate execution environment for executing the operation corresponding to each level. Alternatively, a node below root node 401 may represent an execution environment that receives data from a data repository. In the example of FIG. 4, the first level in the tree represents a data source. Each node in this first level (i.e., nodes 404 and 406) represents a candidate execution environment for receiving the type of data corresponding to the first level. Each link associating a pair of nodes in the tree may represent a cost of transitioning between nodes (i.e., the cost of transitioning from one environment to another). If applicable, this transitioning cost may also include the cost of executing an operation in the execution environment. The link $C_1$ may represent the cost of loading the input data of the hybrid flow into the environment represented by node 404 and C2 may represent the cost of loading the same input data into the environment represented by node 406. A path from the root node to a leaf node may represent a combination of execution environments that may be included in the execution plan of a hybrid flow.

The second level in the hierarchical tree of FIG. 4 may represent the first operation ("operation 1") in the sequence. Nodes 408, 410, 412, and 414 are shown as candidate environments for executing this first operation. In addition to the transfer cost, the cost of executing the first operation in each candidate represented by nodes 408, 410, 412, and 414 may be factored into costs $C_3$, $C_4$, $C_5$, and $C_6$ respectively. The third level in the hierarchical tree may represent the second operation ("operation 2") in the sequence. In the example of FIG. 4, the sequence containing operation 1 and operation 2 may be executed across eight different combinations of execution environments (e.g., starting at the root node 401 and ending with a leaf node 416-430). As with the first operation, the transfer costs and the costs of executing the second operation in the environments represented by leaf nodes 416-430 may be factored into costs $C_7$ thru $C_{14}$ respectively. In one example, optimizer module 116 may select the least cost path of interlinked nodes from the root node to a leaf node. Therefore, the path may include different execution environments or may include one execution environment if executing the flow in one environment is the least costly.

In another example, interface module 114 may allow a user to specify a performance objective for each hybrid flow. In yet a further example, in addition to the costs illustrated above, the execution plan may be optimized in accordance with the specified performance objective. A performance objective may include speed, fault tolerance, or a combination of objectives. In one example, optimizer module 116 may resolve trade-offs to satisfy conflicting objectives by formulating the problem as a maximum vector problem ("skyline computation"). In this instance, optimizer module 116 maximizes a monotone scoring function representing an optimization objective. In a further example, as optimizer module 116 determines solutions for multiple objectives, it may identify a number of states, each of which optimizes an objective. Each state may be stored as a distribution across the execution environments.

By way of example, a parallel database engine and a map-reduce engine may be candidate execution environments. Based on the characteristics of the operations, the cost model, and the objectives, optimizer module 116 may determine that the parallel database engine is the best choice for executing a given operation in a hybrid flow. That is, optimizer module 116 may determine that the parallel database has the best potential for achieving the objective.

Different example distributions are listed in table 500 of FIG. 5. Such table may be generated and analyzed by optimizer 116 to further adjust the execution plan in light of a performance objective. Each row in this illustrative table may represent a branch of the hierarchical tree in FIG. 4. That is, each row may represent a different distribution across a plurality of execution environments. In table 500, identifier column 502 may contain an identifier for each distribution; cost column 504 may represent a total cost of carrying out an execution plan of a hybrid flow; size column 506 may indicate a number of operations in a hybrid flow; recovery point column 508 may contain a number of recovery point operations configured in the distribution; and, parallelization column 510 may indicate the degree of parallelization of the hybrid flow. While a distribution with a higher number of recovery points may be associated with slower performance, such a distribution may better achieve a fault tolerance objective. Conversely, a distribution with a higher parallelization value may better achieve a performance objective; however, such a distribution may not protect well against system failures. Table 500 may further include a score column 512 that may contain a weighted aggregate of all objectives; best-for column 516 may indicate the objective that the distribution is optimal for achieving. Table 500 may be generated by optimizer module 116 and analyzed in view of the objective sought out by a user. By way of example, distribution 441 may be optimal for performance. However, while distribution 951 has a slightly higher cost, it offers better fault tolerance.

Referring back to FIG. 3, the execution of each hybrid flow may be managed in accordance with the execution plan of each hybrid flow, as shown in block 306. The execution plan determined by optimizer module 116 may be based on a presumed status of the candidate execution environments. In real-time, a given execution environment may not have the bandwidth to carry out further operations; moreover, the execution environment may have been retired or replaced.

Referring now to FIG. 6, optimizer module 116 may place a flow f on queue 602. In this example, each flow f on the queue may comprise source code or pointers to the source code of at least one operation in the hybrid flow. Each flow f may also contain an indication of the execution environment in which to execute the source code and the order in which the operation(s) should be implemented relative to other operations in the hybrid flow. In addition, a flow f may also include an identifier associated with the originating hybrid flow. As such, each operation in a hybrid flow may be placed on the queue and executed in accordance with the execution plan. As will be discussed in more detail below, executor module 118 may dequeue a flow and attempt to schedule it for execution in the environment indicated in the flow. In the illustrative system of FIG. 6, there may be three execution environments available, environments 615, 620, and 625. Each environment may have a number of slots available for executing jobs; each job may be associated with a flow in queue 602. The number of slots may correspond to the maximum number of concurrently executing jobs on an execution environment. Environment 615 is shown having fours slots 611-614; the shaded slots represent occupied slots. Environment 620 is shown having only two slots 616 and 617, one of which is available. Environment 625 is shown having six slots 618-623, one of which is occupied. In the example of FIG. 6, a multi programming limit ("MPL") algorithm may be used for scheduling the operations.

Queue 602 shows three flows waiting to be executed. As noted above, each flow may indicate the execution environment in which to execute the flow, the originating hybrid flow, and the order in which to execute the at least one operation in the flow. These indicators are graphically illustrated in FIG. 6 with superscripts and subscripts. Regarding flow 603, the superscript "e0" may indicate that the flow is designated for environment 0 (i.e., environment 615); the subscript "12" may indicate that the operations in the flow belong to a second subset of the operations in hybrid flow "1." Regarding flow 604, the superscript "e1" of flow 604 may indicate that it's designated for execution in environment 1 (i.e., environment 620); the subscript "22" may indicate that the operations in the flow belong to a second subset of operations in a larger hybrid flow "2." With regard to flow 605, the superscript "e0" may indicate that the flow is designated for environment 0 (i.e., environment 615); the subscript "11" may indicate that the operations in flow 605 belong to a first subset of operations in the aforementioned larger hybrid flow "1." In this example, the output of flow 605 is the input for flow 603. Thus, executor module 118 may ensure that the first subset and the second subset execute in the correct order.

When attempting to schedule flow 605, executor module 118 will determine that environment 0 is temporarily unavailable (i.e., all its slots are occupied by executing jobs). Rather than waiting for a slot to become available, executor module 118 may request optimizer module 116 to provide an alternative distribution for the entire hybrid flow, including operations from the second subset, flow 603. Optimizer module 116 may then provide an adjusted distribution in view of the real-time status of the computing environments. Optimizer module 116 may weigh the different strengths and weaknesses of each candidate environment by analyzing data similar to that of table 500 of FIG. 5. For example, in FIG. 6, optimizer module 116 may choose an alternative distribution for flow 603 and flow 605, which are both subsets of the same hybrid flow "1." In the adjusted distribution, the flows may be assigned across environment 620 and environment 625.

Advantageously, the foregoing system, method, and non-transitory computer readable medium optimizes and manages the execution of hybrid flows. Instead of treating each operation in a hybrid flow separately, the hybrid flow may be optimized and managed as a collective. Moreover, the hybrid flow may be further optimized in view of a performance objective. In this regard, large amounts of data from diverse sources may be executed in a manner specified by a user.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
a processor; and
a non-transitory computer readable medium storing instructions that when executed cause the processor to:
specify a hybrid flow comprising a sequence of operations that are executable across a plurality of execution environments;
specify a performance objective of the hybrid flow;
analyze a data object of the hybrid flow to determine attributes of the hybrid flow;
generate an execution plan of the hybrid flow based at least partially on the attributes of the hybrid flow and the specified performance objective of the hybrid flow, the attributes of the hybrid flow comprising costs of executing the operations of the hybrid flow, wherein to generate the execution plan of the hybrid flow, the instructions are executable to cause the processor to:
traverse a plurality of paths in a hierarchical tree from a root node to each of a plurality of leaf nodes, each node in the hierarchical tree representing one of the execution environments and including a cost of executing one of the operations, and each link between two nodes including a cost of transferring data between two of the execution environments,
determine a cost of each of the plurality of paths based on a combination of the cost at each node and the cost at each link in the path, and
select one of the plurality of paths that has a least cost to be the execution plan of the hybrid flow; and
manage real-time execution of the hybrid flow in accordance with the execution plan of the hybrid flow.

2. The system of claim 1, wherein the instructions are executable to cause the processor to utilize skyline computation to optimize the execution plan of the hybrid flow in accordance with the performance objective of the hybrid flow.

3. The system of claim 1, wherein the instructions are executable to cause the processor to adjust the execution plan of the hybrid flow based at least partially on a real time status of an execution environment specified in the execution plan of the hybrid flow.

4. The system of claim 3, wherein to adjust the execution plan of the hybrid flow, the instructions are executable to cause the processor to rearrange the sequence of operations.

5. The system of claim 1, wherein the instructions are executable to cause the processor to determine the cost of each of the plurality of paths based further on an execution start time of the hybrid flow.

6. The system of claim 1, wherein the attributes of the hybrid flow further comprise a flow priority.

7. A non-transitory computer readable medium storing instructions that when executed cause a processor to:
read a request to execute a hybrid flow comprising a sequence of operations that are executable across a plurality of execution environments;
associate the hybrid flow with a data object such that attributes of the hybrid flow are stored in the data object associated with the hybrid flow;
determine the attributes of the hybrid flow from the data object, the attributes of the hybrid flow comprising costs of executing the operations of the hybrid flow;
generate an execution plan of the hybrid flow based at least partially on the attributes of the hybrid flow, wherein to generate the execution plan of the hybrid flow, the instructions are executable to cause the processor to:
traverse a plurality of paths in a hierarchical tree from a root node to each of a plurality of leaf nodes, each node in the hierarchical tree representing one of the execution environments and including a cost of executing one of the operations, and each link between two nodes including a cost of transferring data between two of the execution environments,
determine a cost of each of the plurality of paths based on a combination of the cost at each node and the cost at each link in the path, and
select one of the plurality of paths that has a least cost to be the execution plan of the hybrid flow; and
manage real-time execution of the hybrid flow in accordance with the execution plan of the hybrid flow by adjusting an order of the sequence of operations after an initial execution of the execution plan of the hybrid flow.

8. The non-transitory computer readable medium of claim 7, wherein the instructions cause the processor to optimize the execution plan of the hybrid flow in accordance with a performance objective associated with the hybrid flow.

9. The non-transitory computer readable medium of claim 8, wherein the instructions cause the processor to utilize a skyline computation to optimize the execution plan of the hybrid flow in accordance with the performance objective associated with the hybrid flow.

10. The non-transitory computer readable medium of claim 7, wherein the instructions cause the processor to adjust the order of the sequence of operations of the hybrid flow in accordance with changes in a real time status of an execution environment specified in the execution plan of the hybrid flow.

11. The non-transitory computer readable medium of claim 7, wherein the attributes of the hybrid flow further comprise a flow priority.

12. A method comprising:
reading, using at least one processor, a request to execute a hybrid flow, the hybrid flow comprising a sequence of operations that are executable across a plurality of execution environments;
associating, by the at least one processor, each hybrid flow with a data object;
storing, by the at least one processor, attributes of the hybrid flow and a performance objective of the hybrid flow in the data object;
optimizing, by the at least one processor, an execution plan of the hybrid flow based at least partially on the attributes of the hybrid flow and the performance objective of the hybrid flow, the attributes of the hybrid flow comprising costs of executing the operations of the hybrid flow, wherein optimizing the execution plan of the hybrid flow includes:
traversing a plurality of paths from a root node to each of a plurality of leaf nodes in a hierarchical tree, each node in the hierarchical tree representing one of the execution environments of the hybrid flow and including a cost of executing one of the operations of the hybrid flow, and each link between two nodes in the hierarchical tree including a cost of transferring data between two of the execution environments,
determining a cost of each of the plurality of paths based on a combination of the cost at each node and the cost at each link of the path, and
select one of the plurality of paths that has a least cost to be the execution plan of the hybrid flow; and
managing, by the at least one processor, execution of the hybrid flow in accordance with the execution plan of the hybrid flow.

13. The method of claim 12, further comprising monitoring, by the at least one processor, the execution environments in the execution plan of the hybrid flow.

14. The method of claim 12, further comprising adjusting, by the at least one processor, the execution plan of the hybrid flow in accordance with changes in a real time status of one of the execution environments in the execution plan of the hybrid flow.

15. The method of claim 14, wherein adjusting the execution plan of the hybrid flow comprises rearranging, by the at least one processor, the sequence of operations.

16. The method of claim 12, wherein the attributes of the hybrid flow further comprise a flow priority.

* * * * *